Patented Dec. 9, 1930

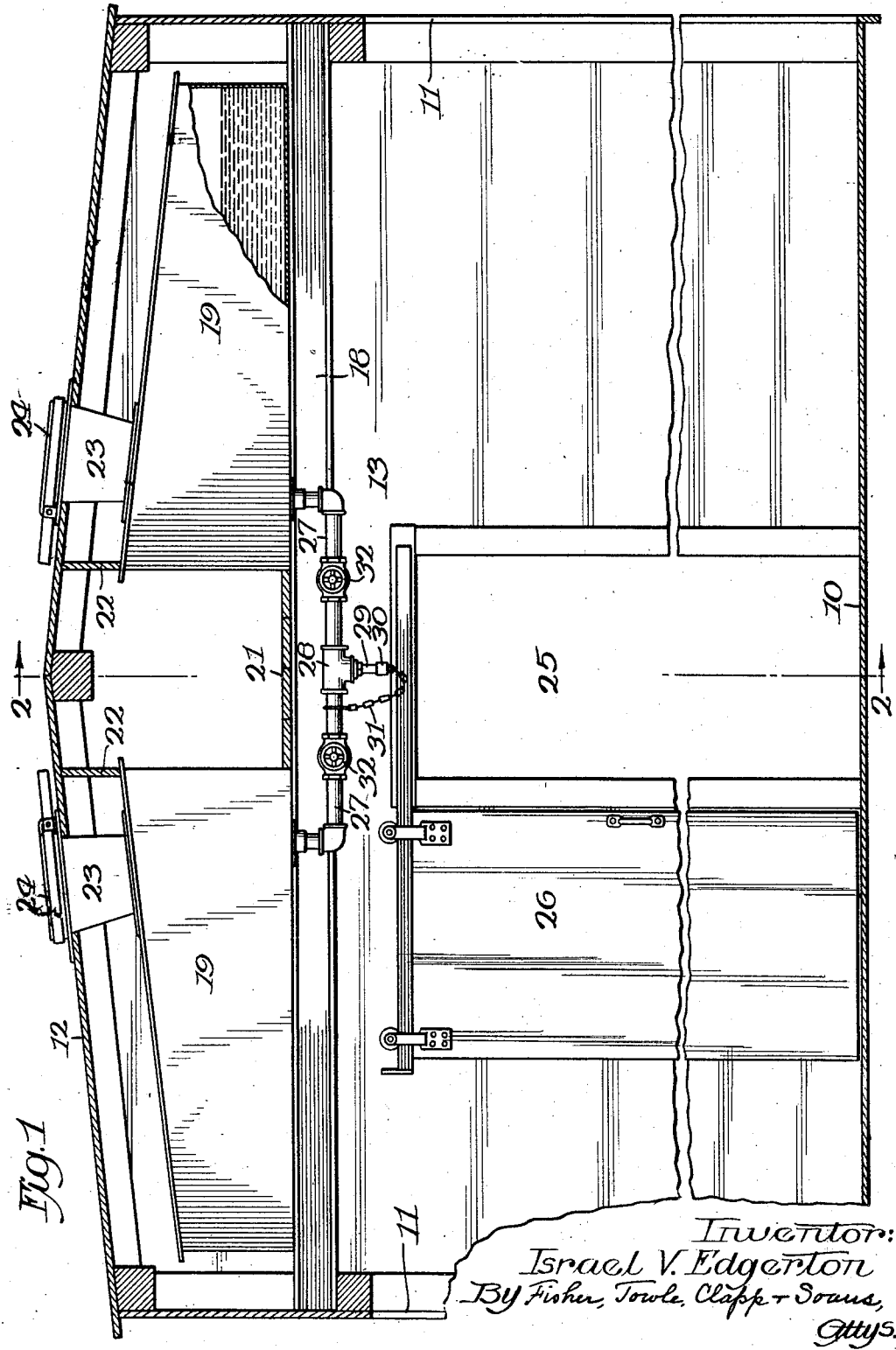

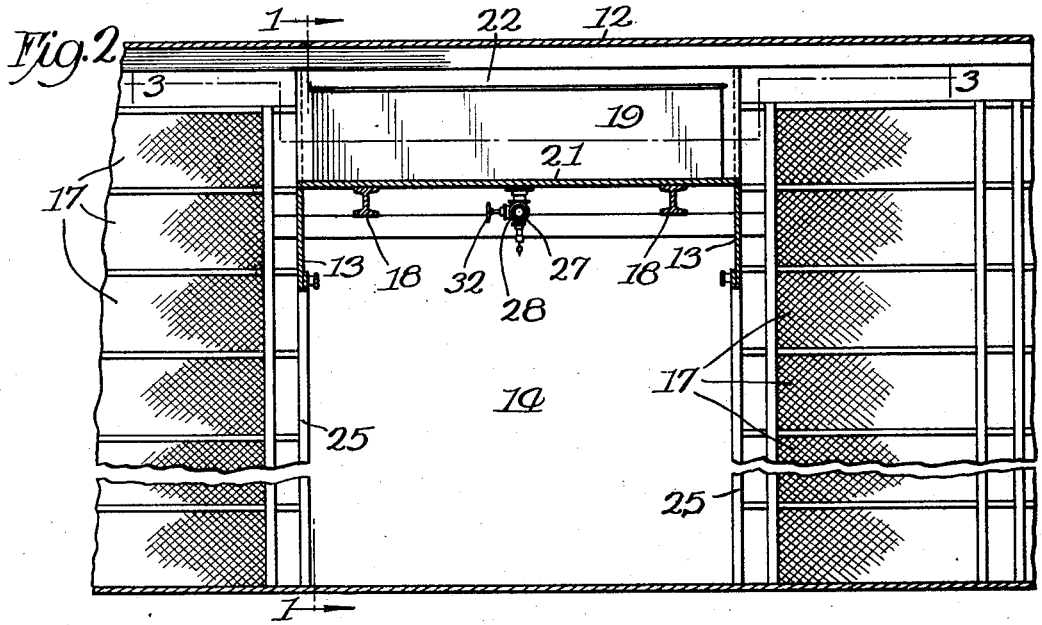
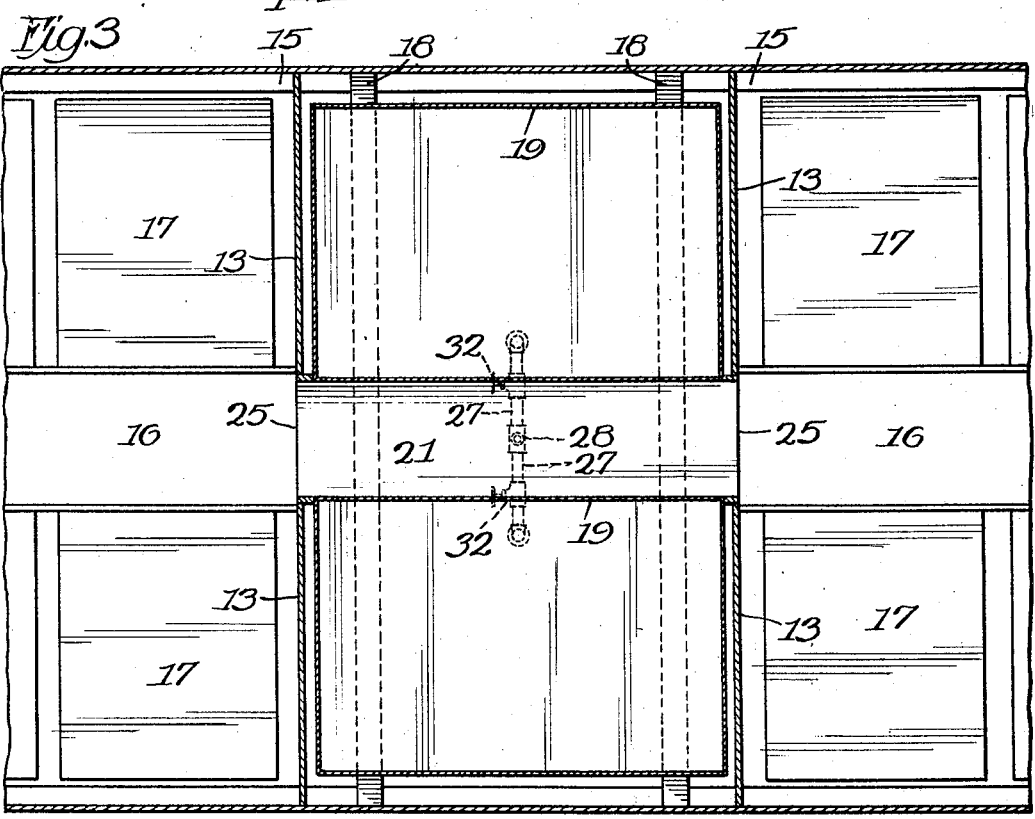

1,784,685

UNITED STATES PATENT OFFICE

ISRAEL V. EDGERTON, OF CHICAGO, ILLINOIS, ASSIGNOR TO PALACE POULTRY CAR COMPANY, OF CHICAGO, ILLINOIS, A CORPORATION OF ILLINOIS

POULTRY CAR

Application filed February 9, 1928. Serial No. 252,975.

This invention relates to railway cars adapted for the transportation of live poultry. The modern poultry car comprises a central state-room for the attendant, this state-room being of the full width of the car, and poultry compartments extending from the state-room to the ends of the car, each poultry compartment having a central aisle and tiers of coops on both sides of the aisle. Adjacent stacks of coops are spaced sufficiently to admit feed and water troughs between them, and an ample supply of water both for the chickens and for car washing and cleaning purposes is stored in a large tank located beneath the roof and over the state-room. This tank heretofore has had a capacity of about eight barrels and extends substantially from side to side of the car. It has been found in practice that when this tank is less than full of water,—for example, about half full, the sidewise rocking of the car body, at fast speeds of travel, causes the water in the tank to surge violently from side to side, and, on account of its relatively high location on the car, this greatly increases the sidewise lurching of the car body. One object of the present invention is to provide an improved water holding means that will largely reduce this tendency of the water to aggravate the sidewise swaying or lurching movement of the car body.

The opposite end walls of the central state-room have doorways communicating with the central aisles of the poultry compartments, these doorways being opened and closed by sliding doors. And the water tank, extending from the ceiling of the state-room to the roof for the full width of the car, obstructs any flow of air from one poultry compartment to the other over the state-room. And since the attendant keeps the state-room doors closed to shut out noises and bad odors at all times except when he is feeding and watering, or otherwise attending to the fowls, the two poultry compartments are practically isolated, so far as any ventilation between them is concerned, at all times except when the state-room doors are open. Another object of the present invention is to provide an improved construction which will afford a free and unobstructed flow of air from either poultry compartment to the other at all times when the state-room doors may be closed.

My invention in one approved form thereof is illustrated somewhat diagrammatically in the accompanying drawings, in which—

Fig. 1 is a vertical cross-section through the state-room of a poultry car taken on the line 1—1 of Fig. 2;

Fig. 2 is a central vertical longitudinal section through the state-room and adjacent portions of the poultry compartments taken on the line 2—2 of Fig. 1;

Fig. 3 is a plan section taken on the line 3—3 of Fig. 2;

Referring to the drawings, 10 designates the floor, 11 the side walls, and 12 the roof of a standard poultry car. Transverse partition walls 13 extending from the floor to the roof divide the interior of the car into a central state-room 14 (Fig. 2) and poultry compartments 15 extending from the partitions 13 to the ends of the car. In each of the poultry compartments is a central aisle 16 flanked on either side by vertical tiers of chicken coops conventionally indicated at 17.

Extending between and supported on the frame members of the side walls 11 within the state-room space 14 are beams 18 that constitute supports for a pair of water tanks 19, said tanks being of equal sizes and capacities and separated by an intermediate ventilating passage 20 that is located centrally above and lengthwise of the state-room 14. The ceiling of the state-room may be formed by the bottoms of the tanks 19 on either side and by a central flooring 21 at the bottom of the ventilating passage 20. The tanks 19 extend nearly to the rafters of the roof 12, and between the tops of the tanks 19 and the under side of the roof are preferably interposed planks 22 which cut off the spaces above the tanks from communication with the ventilating passage 20. The tanks 19 are equipped with the usual filling spouts 23 which extend through the roof 12 and are provided with suitable caps or covers 24.

The end walls 13 of the state-room are formed with doorways 25 that communicate directly with the aisles 16 of the poultry compartments, said doorways being opened and closed by sliding doors 26.

Connected into the bottoms of the water tanks 19 are a pair of pipes 27 extending toward each other and at their adjacent ends fitted into a T-coupling 28, this latter being equipped with a depending discharge spout 29 normally closed by a screw cap 30, which latter may be conveniently hung by a chain 31 from one of the pipes 27. In each of the pipes 27 is a shut-off cock 32. Water may be drawn, as required for use, from either or both tanks by opening either or both of the cocks 32, removing the cap 30, and taking the water in a bucket or by means of a hose fitted over the spout 29.

From the foregoing it will be seen that, instead of employing a single large water tank extending from side to side of the car and completely blocking the space between the ceiling of the state-room and the roof of the car, I employ two separated or spaced tanks, the contents of each being normally entirely separated from the contents of the other. As a result of this construction, the lateral surging effect of the entire body of water is substantially reduced, as compared with the surging effect in a single large tank, and its corresponding effect on the car body is correspondingly lessened. Furthermore, since the ends of the central passage 20 between the water tanks communicate freely with the upper portions of the poultry compartments, full and free ventilation is afforded at all times through said passageway, this being of especial advantage at night and at other times when the doors of the state-room are closed.

I claim—

1. A poultry car, comprising a central state-room, poultry compartments at the ends of said state-room with tiers of coops therein and a longitudinal center aisle between said tiers, and a pair of water tanks disposed above said state-room on opposite sides of the median longitudinal vertical plane of the car, the inner walls of said tanks being spaced apart to form a passageway for the circulation of air over the top of the state-room and between the aisles of the poultry compartments.

2. A poultry car, comprising a central state-room, poultry compartments at the ends of said state-room with tiers of coops therein and a longitudinal center aisle between said tiers, and a pair of symmetrical water tanks of substantially equal capacities disposed above said state-room on opposite sides of the median longitudinal vertical plane of the car, the inner walls of said tanks being spaced apart to form a passageway for the circulation of air over the top of the state-room and between the aisles of said poultry compartments, and filling strips between the inner portions of the tops of said tanks and the under surface of the car roof.

ISRAEL V. EDGERTON.